US010261476B2

(12) United States Patent
Zanesco et al.

(10) Patent No.: US 10,261,476 B2
(45) Date of Patent: Apr. 16, 2019

(54) PORTABLE OBJECT COMPRISING A ROTATING CONTROL STEM WHOSE ACTUATION IS DETECTED BY MEASURING MAGNETIC INDUCTION

(71) Applicant: ETA SA Manufacture Horlogere Suisse, Grenchen (CH)

(72) Inventors: Vittorio Zanesco, Neuchatel (CH); Pascal Lagorgette, Bienne (CH); Pascal Meyer, Neuchatel (CH); Damien Schmutz, Salavaux (CH); Raphael Balmer, Vicques (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 0 days.

(21) Appl. No.: 15/791,510

(22) Filed: Oct. 24, 2017

(65) Prior Publication Data

US 2018/0157218 A1    Jun. 7, 2018

(30) Foreign Application Priority Data

Dec. 6, 2016  (EP) .................................... 16202476

(51) Int. Cl.
*G04G 21/00*  (2010.01)
*G01L 5/20*   (2006.01)
*G04B 3/04*   (2006.01)
*G04C 3/00*   (2006.01)

(52) U.S. Cl.
CPC ................ *G04G 21/00* (2013.01); *G01L 5/20* (2013.01); *G04B 3/041* (2013.01); *G04C 3/001* (2013.01); *G04C 3/004* (2013.01)

(58) Field of Classification Search
CPC .......... G01D 5/20; G04B 3/041; G04C 3/001; G04C 3/004; G04G 21/00; H01H 25/06
See application file for complete search history.

(56) References Cited

U.S. PATENT DOCUMENTS 4,038,814 A * 8/1977 Niida ..................... G04C 3/004
                                                368/291
6,134,189 A * 10/2000 Carrard .................. G04C 3/004
                                                368/187
6,252,825 B1   6/2001 Perotto
(Continued)

FOREIGN PATENT DOCUMENTS

EP   2 261 938 A2   12/2010
FR   2 759 792      8/1998

OTHER PUBLICATIONS

European Search Report dated May 15, 2017 in European Application 16202476.4, filed on Dec. 6, 2016 (with English Translation of Categories of cited documents).

*Primary Examiner* — Sean P Kayes
(74) *Attorney, Agent, or Firm* — Oblon, McClelland, Maier & Neustadt, L.L.P.

(57) ABSTRACT

Portable object comprising a frame arranged to serve as a cradle for a control stem, the actuation in rotation of which makes it possible to control at least one electronic or mechanical function of the portable object, a magnetized ring being driven in rotation by the control stem, the rotation of the magnetized ring being detected by at least one inductive sensor disposed inside a housing of the frame inside which the inductive sensor is held by elastic means.

19 Claims, 12 Drawing Sheets

(56) References Cited

U.S. PATENT DOCUMENTS

| | | | | |
|---|---|---|---|---|
| 7,404,667 B2* | 7/2008 | Born | ............... | G04C 3/004 |
| | | | | 368/190 |
| 7,794,138 B2* | 9/2010 | Hilfiker | ............ | A61B 5/02438 |
| | | | | 368/190 |
| 8,220,987 B2* | 7/2012 | Kimura | ............ | G04C 3/004 |
| | | | | 368/293 |
| 8,305,171 B2* | 11/2012 | Kimura | ............ | G04C 3/004 |
| | | | | 335/205 |
| 2010/0309756 A1 | 12/2010 | Kimura et al. | | |

\* cited by examiner

PORTABLE OBJECT COMPRISING A ROTATING CONTROL STEM WHOSE ACTUATION IS DETECTED BY MEASURING MAGNETIC INDUCTION

This application claims priority from European Patent Application No. 16202476.4 filed on Dec. 6, 2016; the entire disclosure of which is incorporated herein by reference.

FIELD OF THE INVENTION

The present invention concerns a portable object of small dimensions such as a timepiece, comprising a rotating control stem for controlling at least one electronic or mechanical function of the portable object. More specifically, the invention concerns such a portable object wherein actuation of the rotating control stem is detected by measuring magnetic induction.

BACKGROUND OF THE INVENTION

The present invention concerns portable objects of small dimensions, such as wristwatches, that comprise a rotating control stem, the actuation of which controls a mechanical or electronic function of the portable object in which the rotating control stem is arranged.

To properly perform the mechanical or electronic function concerned, it must be possible to detect the actuation of the rotating control stem. Among various possible solutions, one consists in measuring the variation in magnetic induction produced by the rotation of a magnet integral with the control stem. To detect this variation in magnetic induction, it is possible to use a magnetic sensor of the Hall effect type which is capable of measuring the value of magnetic induction of the environment in which it is located.

A recurrent problem that arises in the field of detecting the rotation of a control stem by measuring magnetic induction is that of the reproducibility of the measurement from one portable object to another. Indeed, the portable objects referred to here, such as wristwatches, are produced in large quantities on an industrial scale. It is therefore necessary to take steps to ensure the best possible reproducibility of the magnetic induction measurement from one object to another, without these steps adding too much to the final cost price of the portable object. In order to ensure good reproducibility of a magnetic induction measurement, it must be possible to ensure the proper relative positioning of the magnet and the inductive sensor.

SUMMARY OF THE INVENTION

It is an object of the present invention to overcome the aforementioned problems, in addition to others, by providing a portable object comprising a rotating stem for controlling at least one mechanical or electronic function of the portable object, the actuation of the rotating stem being detected in a reliable and reproducible manner by means of an inductive sensor.

To this end, the present invention concerns a portable object comprising a frame arranged to serve as a cradle for a rotating control stem, the actuation of which controls at least one electronic or mechanical function of the portable object, a magnetized ring being driven in rotation by the rotating control stem, the rotation of the magnetized ring being detected by at least one inductive sensor held in abutment against a surface of the frame.

An 'inductive sensor' means a sensor that transforms a magnetic field passing there through into electric voltage due to the phenomenon of induction defined by Lenz's law and Faraday's law. By way of example, this may be a Hall effect sensor or a magnetoresistance component of the AMR (anisotropic magnetoresistance), GMR (giant magnetoresistance) or TMR (tunneling magnetoresistance) type.

As a result of these features, the present invention provides a portable object in which detection of the rotation of a control stem controlling at least one mechanical or electronic function of the portable object is obtained by measuring the variation in magnetic induction caused by the rotation of a magnetized ring driven by the control stem by means of an inductive sensor. This sensor is held in abutment against a surface of a frame of the portable object. Thus, the precision of the relative arrangement of the magnetized ring and the inductive sensor is determined only by the precision with which the frame is manufactured. Indeed, the magnetized ring is driven by the control stem which is carried by the frame, and the inductive sensor is held in abutment against a surface of the frame. The frame is typically produced by very high-precision injection of plastic material. Consequently, the precision of the relative arrangement of the magnet and the Hall effect sensor is very satisfactory and especially entirely reproducible from one portable object to another, even in mass production conditions, which is quite remarkable.

According to other features of the invention which form the subject of the dependent claims:
- the inductive sensor is disposed inside a housing of the portable object frame in which it is held by elastic means;
- the portable object includes a holding plate provided with an elastic finger which, by pressure on the inductive sensor, holds the inductive sensor inside the housing in which it is disposed;
- the inductive sensor is fixed to a flexible printed circuit sheet and the elastic finger presses on the flexible printed circuit sheet at the place where the inductive sensor is fixed;
- the elastic finger ensures the immobilisation of the inductive sensor in a vertical direction;
- the elastic finger is arranged to force the inductive sensor against a bottom of the housing inside which it is disposed;
- the portable object includes two inductive sensors which are arranged on either side of a vertical plane of longitudinal symmetry of the control stem;
- the two inductive sensors are arranged with respect to the rotating control stem such that, when the magnetized ring rotates as a result of actuation of the rotating control stem, the two inductive sensors produce signals that are out of phase relative to each other by an angle comprised between 60° and 120°.

As a result of these other features, the inductive sensor is held by elastic means inside the frame housing in which it is disposed, which makes it possible to compensate for any play and thus to ensure precise and reproducible positioning between the magnet and the inductive sensor.

BRIEF DESCRIPTION OF THE DRAWINGS

Other features and advantages of the present invention will appear more clearly from the following detailed description of an example embodiment of a portable object according to the invention, this example being given only by way of non-limiting illustration with reference to the annexed drawing, in which.

DETAILED DESCRIPTION OF ONE EMBODIMENT OF THE INVENTION

The present invention proceeds from the general inventive idea which consists in detecting the rotation of a control stem mounted in a portable object of small dimensions, such as a timepiece, in a reliable and reproducible manner from one portable object to another, particularly in the case of mass production. To overcome this problem, a magnetized ring that is preferably bipolar, but which may also be multipolar, is used. This magnetized ring is driven in rotation by the control stem and the variation in magnetic induction caused by rotation of the ring is detected by means of an inductive sensor. To ensure the reproducibility of the measurement from one portable object to another, the invention teaches the use of a frame which serves as a cradle for the control stem and against one surface of which the inductive sensor is held in abutment. The positioning precision of the magnetized ring and of the inductive sensor is thus determined by the manufacturing precision of the frame. In the case where the frame is, for example, made by injection of plastic material or made of a non-magnetic metallic material such as brass, this precision is excellent and thus ensures the reproducibility of the measurement from one object to another, even in large scale industrial manufacturing conditions. Further, because, in a preferred variant embodiment of the invention, the inductive sensor is held inside its housing by elastic means, this makes it possible to compensate for any play.

In all that follows, the back-to-front direction is a rectilinear direction which extends horizontally along longitudinal axis of symmetry X-X of the control stem from the external actuation crown towards the interior of the portable object equipped with the control device, parallel to a plane in which a back of the portable object extends. Thus, the control stem will be pushed from back to front, and will be pulled from front to back. Further the vertical direction is a direction that extends perpendicularly to the plane in which the control stem extends.

Figure 1:
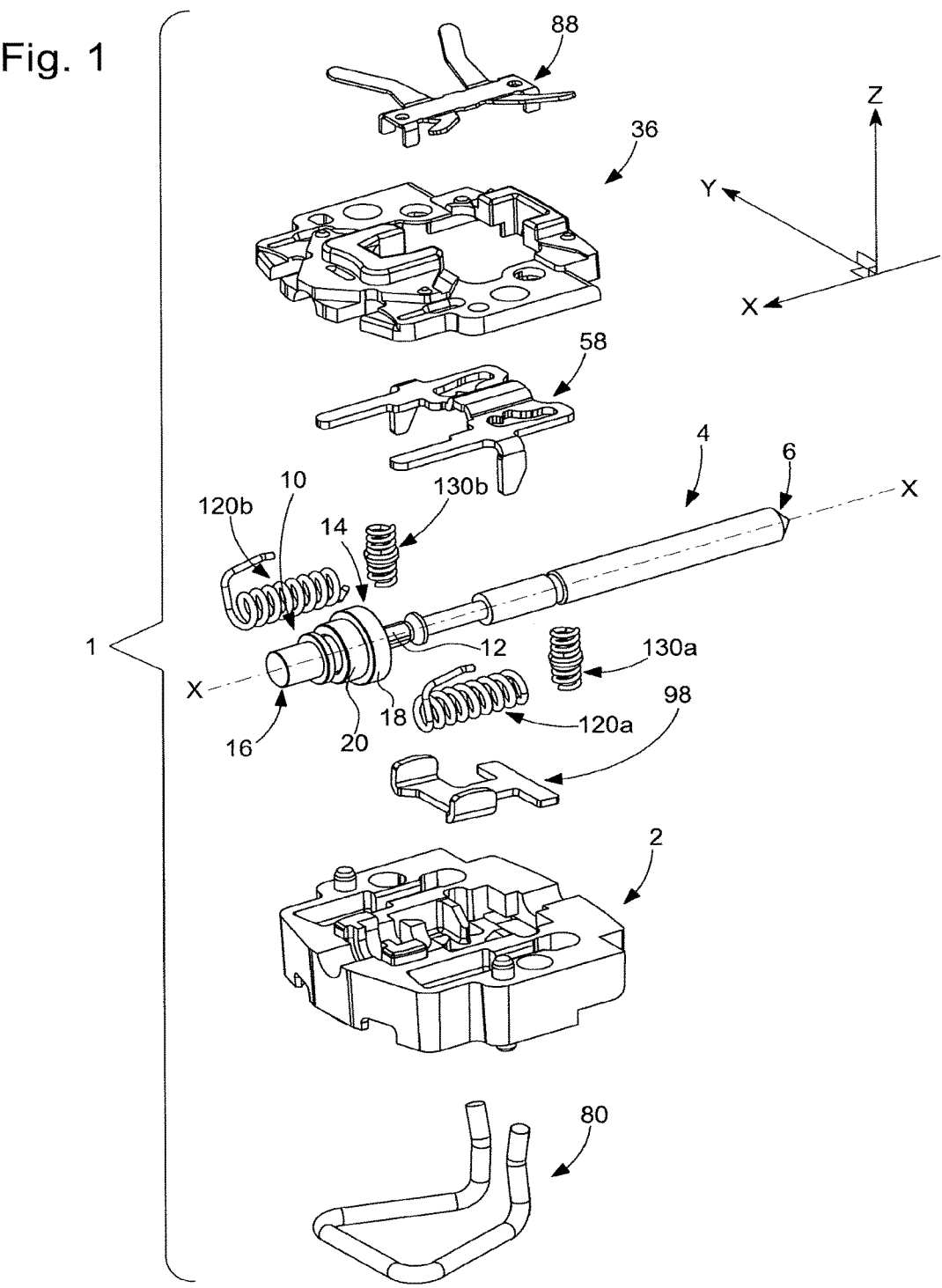
FIG. 1 is a perspective view, in an unassembled state, of a device for controlling at least one electronic function of a portable object of small dimensions.

FIG. 1 is a perspective view, in an unassembled state, of a device for controlling at least one electronic function of a portable object of small dimensions, such as a wristwatch. Designated as a whole by the general reference number 1, this control device includes a lower frame 2, for example made of an injected plastic material or of a non-magnetic metallic material such as brass, and serves as a cradle for a control stem 4, preferably of elongated and substantially cylindrical shape, provided with a longitudinal axis of symmetry X-X. This control stem 4 is arranged to slide from front to back and from back to front along its longitudinal axis of symmetry X-X and/or to rotate about said same axis of longitudinal symmetry X-X in the clockwise and anti-clockwise direction.

Figure 20:
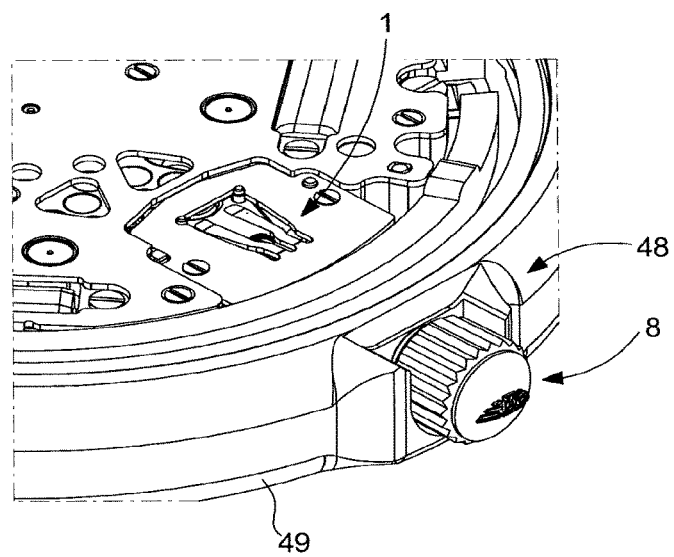
FIG. 20 is a perspective view of the control device installed in a portable object.

At a rear end 6, which will be located outside the portable object once the latter is equipped with a control device 1, control stem 4 will receive an actuation crown 8 (see FIG. 20).

At a front end 10, which will be located inside control device 1 once the latter is assembled, control stem 4 has, for example, a square section 12 and receives in succession a magnetic assembly 14 and a smooth bearing 16.

Figure 4:
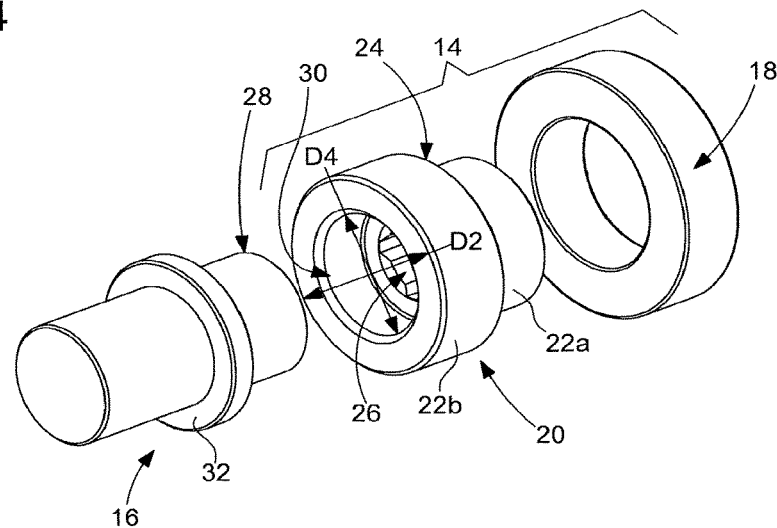
FIG. 4 is a perspective view, in an unassembled state, of the smooth bearing and of the magnetic assembly formed of a support ring and a magnetized ring.
Figure 5:
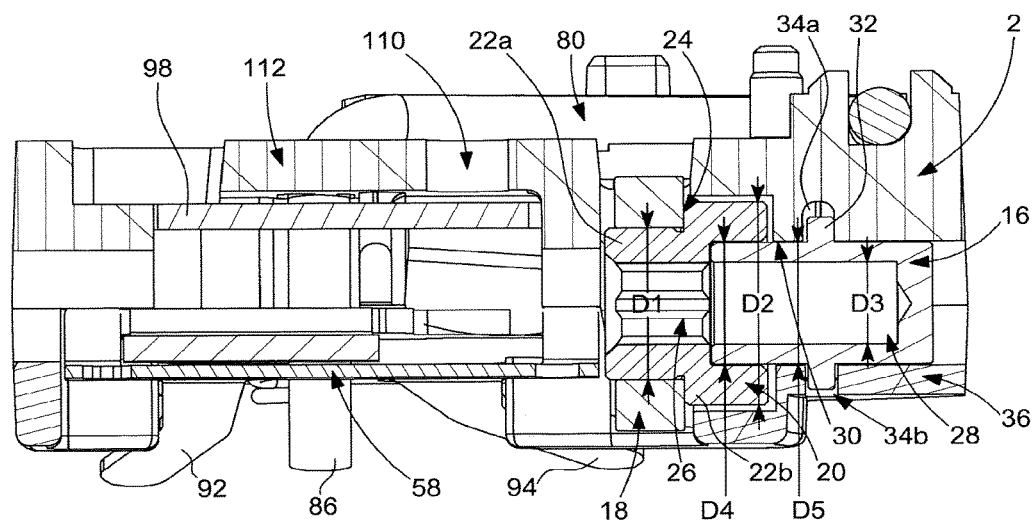
FIG. 5 is a longitudinal cross-sectional view along a vertical plane of a control device inside which are arranged the smooth bearing and the magnetic assembly formed of the support ring and the magnetized ring.

Magnetic assembly 14 includes a magnetized ring 18 and a support ring 20, on which magnetized ring 18 is fixed, typically by adhesive bonding (see FIG. 4). Support ring 20 is a component of generally cylindrical shape. As seen in FIG. 5, support ring 20 has, from back to front, a first section 22a having a first external diameter D1 on which is engaged magnetized ring 18, and a second section 22b having a second external diameter D2 greater than first external diameter D1 and which delimits a shoulder 24 against which magnetized ring 18 abuts. The first section 22a of support ring 20 is pierced with a square hole 26 which is adapted in shape and size to square section 12 of control stem 4 and forms with control stem 4 a sliding pinion type system. In other words, support ring 20 and magnetized ring 18 remain immobile when control stem 4 is made to slide axially. However, control stem 4 drives support ring 20 and magnetized ring 18 in rotation when control stem 4 is rotated. It is clear from the foregoing that magnetized ring 18, carried by support ring 20, is not in contact with control stem 4 which makes it possible to protect it in the event of shocks applied to the portable object equipped with a control device 1.

Smooth bearing 16 defines (see FIG. 5) a cylindrical housing 28 whose first internal diameter D3 is very slightly greater than the diameter of the circle in which is inscribed square section 12 of control stem 4, to allow control stem 4 to slide axially and/or to rotate inside this cylindrical housing 28. Smooth bearing 16 thus ensures perfect axial guiding of control stem 4.

It is noted that the square hole 26 provided in first section 22a of support ring 20 is extended towards the front of control device 1 by an annular hole 30 whose second internal diameter D4 is fitted onto third external diameter D5 of smooth bearing 16. Support ring 20 is thus fitted for free rotation on smooth bearing 16 and moves into axial abutment against smooth bearing 16, which ensures the perfect axial alignment of these two components and makes it possible to correct any problems of concentricity that may be caused by a sliding pinion type coupling.

Figure 2:
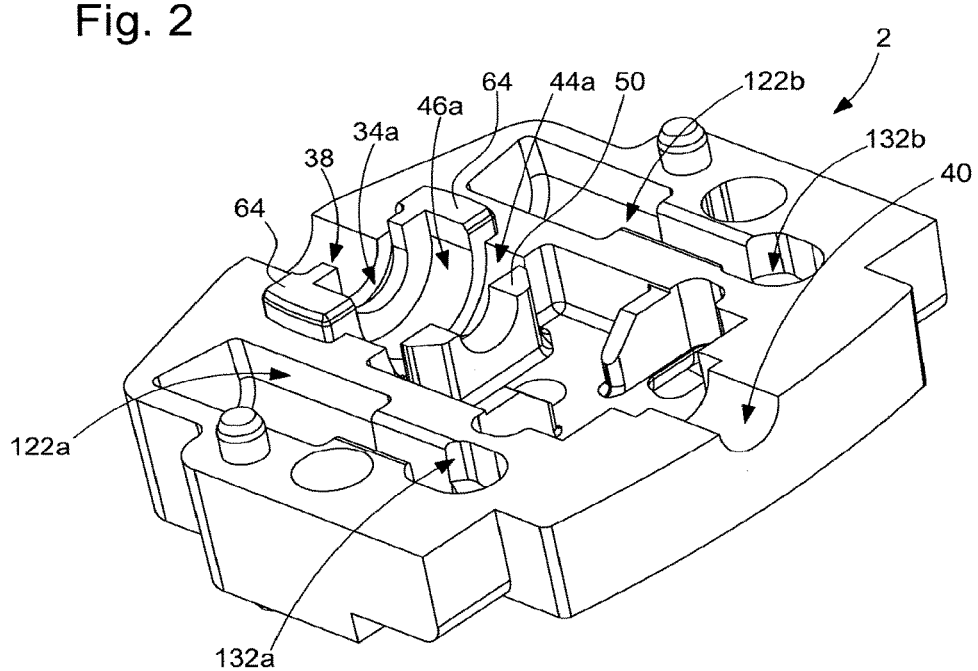
FIG. 2 is a top, perspective view of the lower frame.
Figure 6:
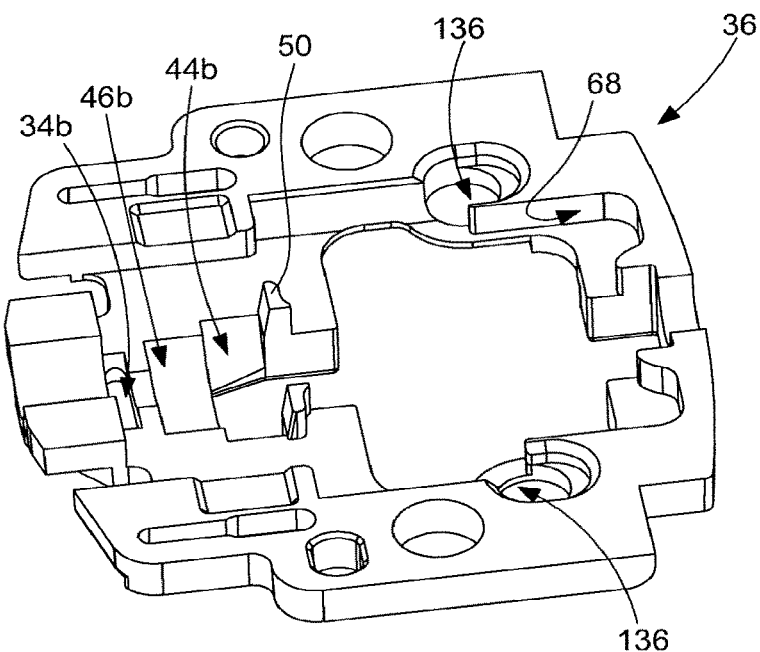
FIG. 6 is a bottom, perspective view of the upper frame.

It is observed that, for axial immobilization thereof, smooth bearing 16 is provided on its outer surface with a circular collar 32 which projects into a first groove 34a and into a second groove 34b, respectively arranged in lower frame 2 (see FIG. 2) and in an upper frame 36 (see FIG. 6), arranged to cover lower frame 2 and, for example, made of an injected plastic material or of a non-magnetic metallic material. These two lower and upper frames 2 and 36 will be described in detail below.

It is important to note that the magnetic assembly 14 and smooth bearing 16 described above are indicated purely for illustrative purposes. Indeed, smooth bearing 16, for example made of steel or brass, is arranged to prevent control stem 4, for example made of steel, rubbing against lower and upper frames 2 and 36, and causing wear of the plastic material of which these two lower and upper frames 2 and 36 are typically made. However, in a simplified embodiment, it is possible to envisage not using such a smooth bearing 16 and arranging for control stem 4 to be directly carried by lower frame 2.

Likewise, magnetized ring 18, and support ring 20 on which magnetized ring 18 is fixed, are intended for the case where rotation of control stem 4 is detected by a local variation in the magnetic field induced by the pivoting of magnetized ring 18. It is, however, entirely possible to envisage replacing magnetic assembly 14, for example with a sliding pinion which, according to its position, will for example control the winding of a mainspring or the time-setting of a watch equipped with control device 1.

It is also important to note that the example of control stem 4 provided on one part of its length with a square section is given purely for illustrative purposes. Indeed, in order to drive magnetic assembly 14 in rotation, control stem 4 may have any type of section other than a circular section, for example triangular or oval.

Lower frame 2 and upper frame 36, the combined assembly of which defines the external geometry of control device 1, are for example of generally parallelepiped shape. Lower frame 2 forms a cradle which receives control stem 4. To this end (see FIG. 2), lower frame 2 includes, towards the front, a first receiving surface 38 of semicircular profile, which serves as a seat for smooth bearing 16 and in which is provided the first groove 34a which receives circular collar 32. Both axial and rotational immobilization of smooth bearing 1 are thus ensured.

Figure 21:
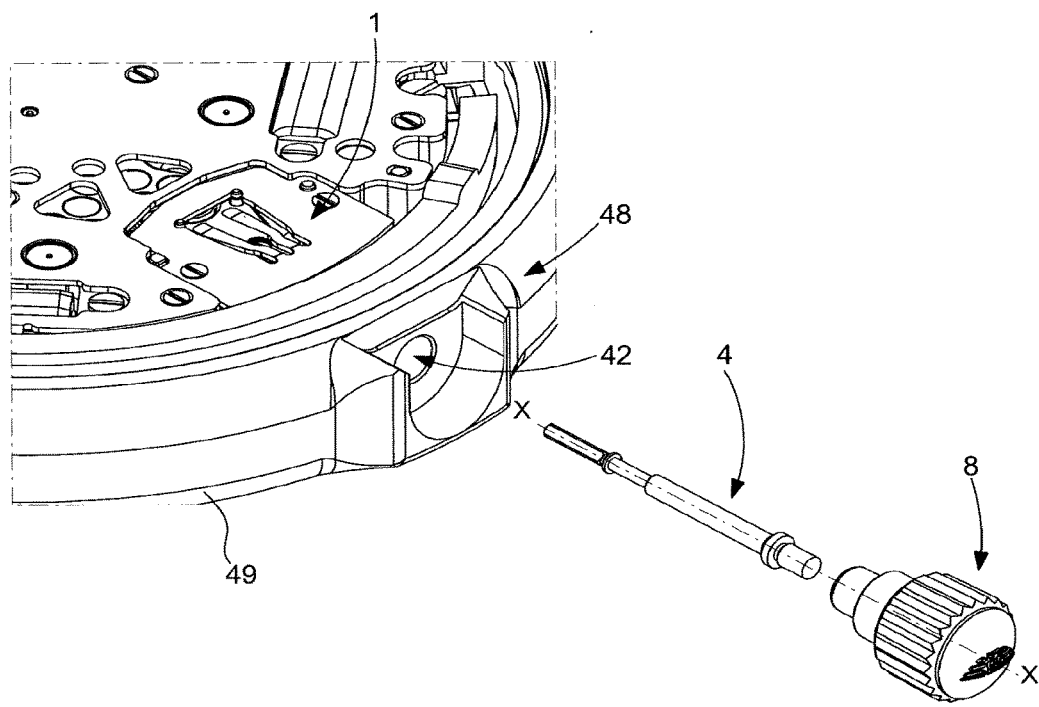
FIG. 21 is a similar view to that of FIG. 20, with the control stem removed from the portable object.

Lower frame 2 further includes, towards the back, a second receiving surface 40, whose semicircular profile is centred on longitudinal axis of symmetry X-X of control stem 4, but whose diameter is greater than that of control stem 4. It is important to understand that control stem 4 only rests on second receiving surface 40 at the stage when the assembled control device 1 is tested prior to being integrated in the portable object. At this assembly stage, control stem 4 is inserted into control device 1 for test purposes and extends horizontally, supported and axially guided by smooth bearing 16 at its front end 10 and via second receiving surface 40 at its rear end 6. However, once control device 1 is integrated in the portable object, control stem 4 passes through a hole 42 provided in case middle 48 of the portable object in which it is guided and supported (see FIG. 21) and which is delimited downwardly by a bottom case 49.

Third and fourth clearance surfaces 44a and 46a of semicircular profile are also provided in lower frame 2 and complementary clearance surfaces 44b and 46b (see FIG. 6) are provided in upper frame 36 for receiving magnetic assembly 14, formed of magnetized ring 18 and of its support ring 20. It will be noted that magnetized ring 18 and its support ring 20 are not in contact with third and fourth clearance surfaces 44a and 46a and complementary clearance surfaces 44b and 46b when control device 1 is assembled and mounted in the portable object. It is also noted that third clearance surface 44a and its corresponding complementary clearance surface 44b are delimited by an annular collar 50 for axially locking magnetic assembly 14.

Figure 3:
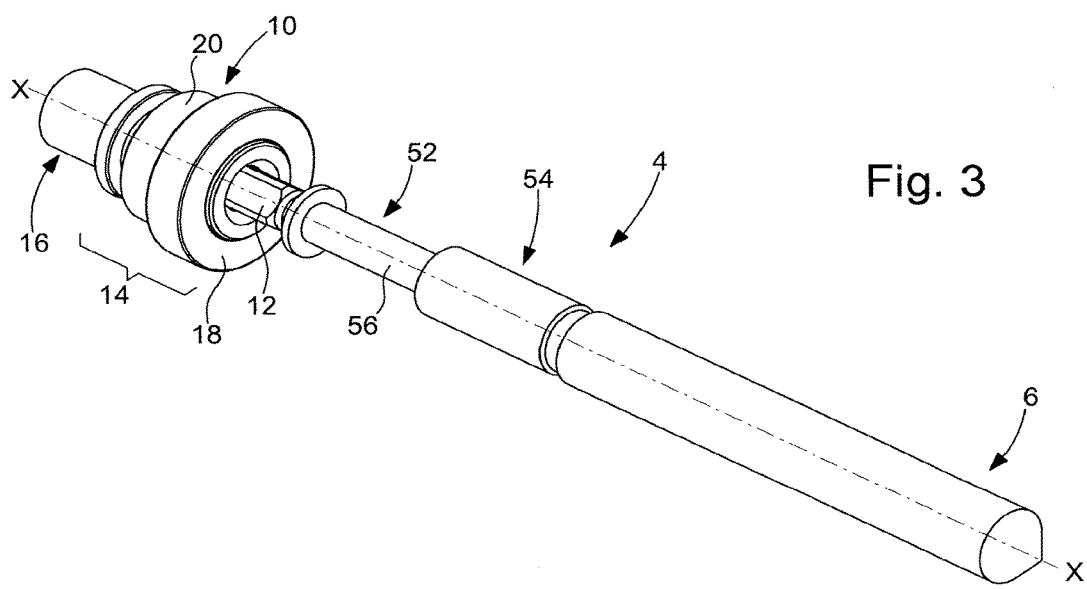
FIG. 3 is a perspective view of the control stem which, from right to left in the Figure, extends from its rear end to its front end.

As visible in FIG. 3, behind square section 12, control stem 4 has a cylindrical section 52 whose diameter is comprised between the diameter of the circle in which is inscribed square section 12 of control stem 4 and the primitive diameter of a rear section 54 of said control stem 4, at the end of which is fixed actuation crown 8. This cylindrical section 52 of reduced diameter forms a groove 56 inside which is placed a position indexing plate 58 for control stem 4 (see FIG. 7A). To this end, position indexing plate 58 has a curved portion 60 which follows the profile of reduced diameter cylindrical section 52. Position indexing plate 58 may be, for example, obtained by stamping a thin, electrically conductive metal sheet. However, it is also possible to envisage making position indexing plate 58, for example, by moulding a hard plastic material loaded with conductive particles. The engagement of position indexing plate 58 in groove 56 ensures the coupling in translation, from front to back and from back to front, between control stem 4 and position indexing plate 58. However, as will become clearer below, position indexing plate 58 is free with respect to control stem 4 in a vertical direction z perpendicular to the longitudinal axis of symmetry X-X of control stem 4.

Figure 7A:
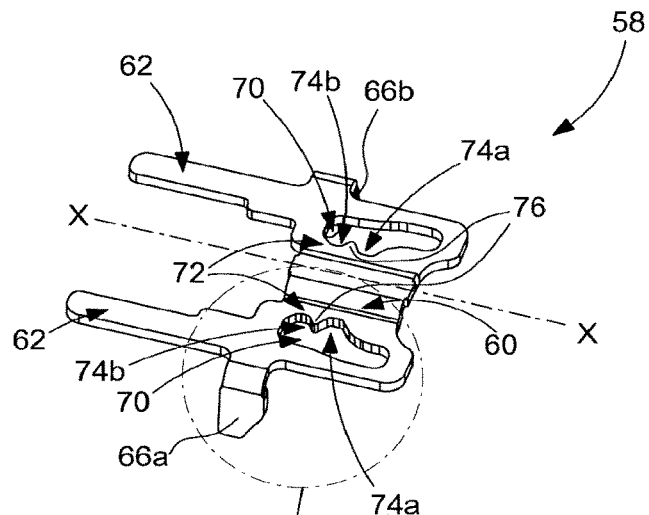
FIG. 7A is a top, perspective view of the plate for indexing the position of the control stem.

As visible in FIG. 7A, position indexing plate 58 is a substantially flat and generally U-shaped part. This position indexing plate 58 includes two substantially rectilinear guide arms 62 which extend parallel to each other and which are connected to each other by curved portion 60. These two guide arms 62 are axially guided for example against two studs 64 arranged in lower frame 2 (see in particular FIG. 2). Guided by its two guide arms 62, position indexing plate 58 slides along a rim 68 arranged in upper frame 36 and whose perimeter corresponds to that of position indexing plate 58 (see FIG. 6). Position indexing plate 58 also includes two fingers 66a, 66b which extend vertically downwards on either side of the two guide arms 62. In sliding along rim 68, position indexing plate 58 has the function of ensuring the translational guiding of control stem 4 from front to back and from back to front. Fingers 66a, 66b, are intended, in particular, to prevent position indexing plate 58 from bracing when the latter moves in translation.

Figure 7B:
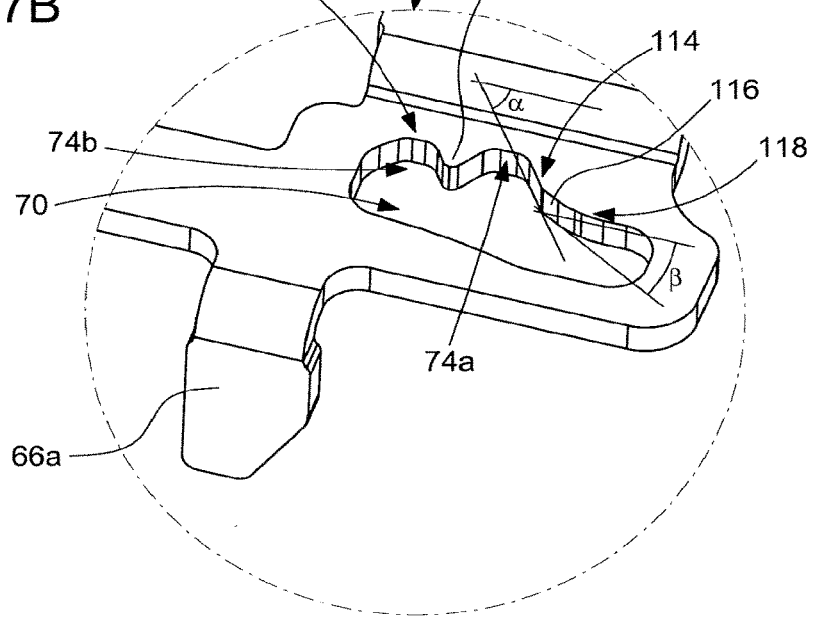
FIG. 7B is a larger scale view of the area encircled in FIG. 7A.

Two apertures 70 exhibiting an approximately rectangular contour are provided in guide arms 62 of position indexing plate 58 (see in particular FIG. 7B). These two apertures 70 extend symmetrically on either side of longitudinal axis of symmetry X-X of control stem 4. The sides of the two apertures 70 closest to longitudinal axis of symmetry X-X of control stem 4 have a profile 72 of substantially sinusoidal shape, formed of a first and a second recess 74a, 74b separated by a peak 76.

Figure 8:
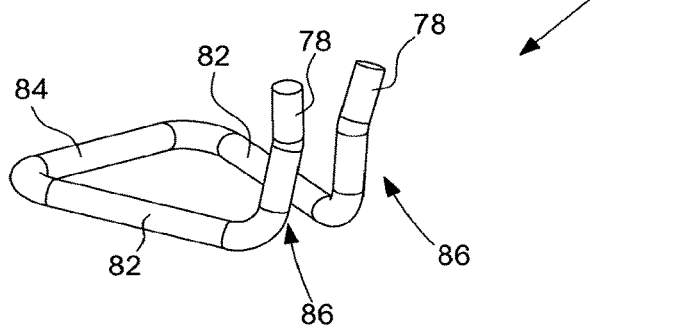
FIG. 8 is a perspective view of the positioning spring arranged to cooperate with the plate for indexing the position of the control stem.

The two apertures 70 provided in guide arms 62 are intended to receive the two ends 78 of a positioning spring 80 (see FIG. 8). This positioning spring 80 is generally U-shaped with two arms 82 which extend in a horizontal plane and which are connected to each other by a base 84. At their free end, the two arms 82 are extended by two substantially rectilinear arbors which stand upright. Positioning spring 80 is intended to be mounted in control device 1 through the bottom of lower frame 2, so that ends 78 of arbors 86 project into apertures 70 of position indexing plate 58. It will be seen below that the cooperation between position indexing plate 58 and positioning spring 80 makes it possible to index the position of control stem 4 between an unstable pushed-in position T0 and two stable positions T1 and T2.

Figure 9:
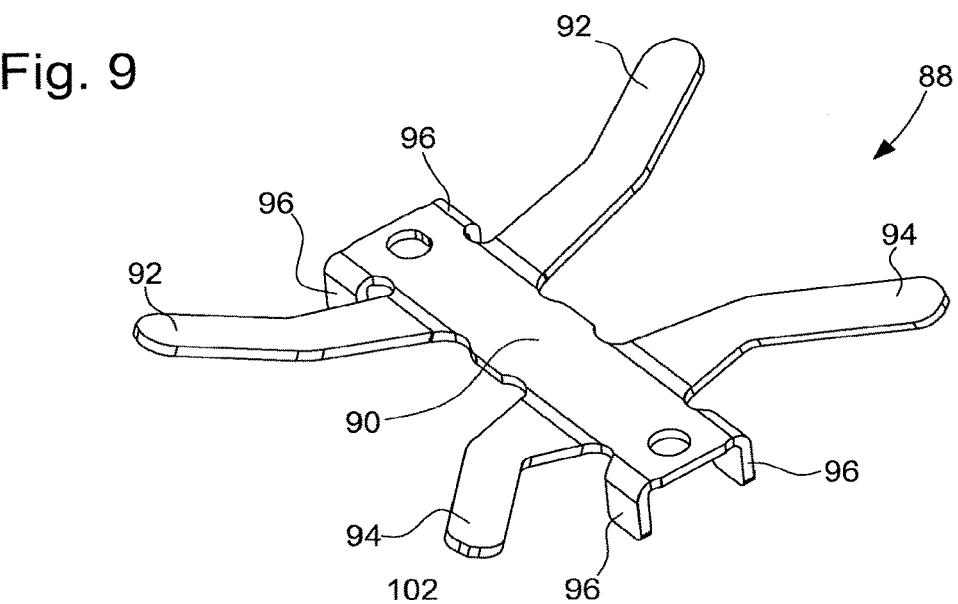
FIG. 9 is a top, perspective view of the spring for limiting the displacement of the control stem position indexing plate.
Figure 11:
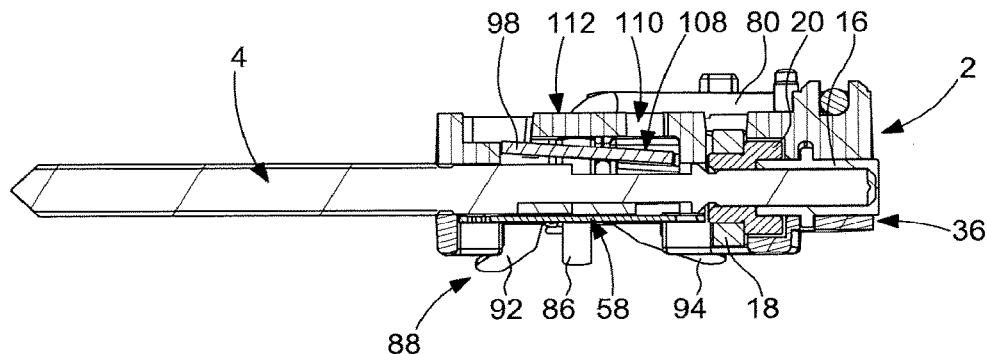
FIG. 11 is a longitudinal cross-sectional view of one part of the control device showing the hole into which a pointed tool is inserted to release the control stem from the position indexing plate.

It was mentioned above that position indexing plate 58 is coupled in translation to control stem 4, but that it is free with respect to control stem 4 in the vertical direction z. It is thus necessary to take steps to prevent position indexing plate 58 from becoming disengaged from control stem 4 in normal conditions of use, for example under the effect of gravity. To this end (see FIGS. 9 and 11), a spring 88 for limiting the displacement of position indexing plate 58 in vertical direction z is placed above and at a short distance from position indexing plate 58. Displacement limiting spring 88 is captive between lower frame 2 and upper frame 36 of control device 1, but is not, in normal conditions of use, in contact with position indexing plate 58, which prevents parasitic friction forces being exerted on control stem 4, which would make the latter difficult to operate and cause problems of wear. Displacement limiting spring 88 is, however, sufficiently close to position indexing plate 58 to prevent the latter being inadvertently uncoupled from control stem 4.

Displacement limiting spring 88 includes a substantially rectilinear central portion 90 from the ends of which extend two pairs of elastic arms 92 and 94. These elastic arms 92 and 94 extend on either side of central portion 90 of displacement limiting spring 88, upwardly away from the horizontal plane in which central portion 90 extends. As these elastic arms 92 and 94 are compressed when upper frame 36 is joined to lower frame 2, they impart elasticity to displacement limiting spring 88 along vertical direction z. Between the pairs of elastic arms 92 and 94 there is also provided one pair, and preferably two pairs, of stiff lugs 96 which extend perpendicularly downwards on either side of central portion 90 of displacement limiting spring 88. These stiff lugs 96 which move into abutment on lower frame 2 when upper frame 36 is placed on lower frame 2, ensure that a minimum space is provided between position indexing plate 58 and displacement limiting spring 88 in normal operating conditions of control device 1.

Displacement limiting spring 88 guarantees the dismantlability of control device 1. Indeed, in the absence of displacement limiting spring 88, position indexing plate 58 would have to be integral with control stem 4 and, consequently, control stem 4 could no longer be dismantled. If control stem 4 cannot be dismantled, the movement of the timepiece equipped with control device 1 cannot be dismantled either, which is not conceivable, particularly in the case of an expensive timepiece. Thus, when control device 1, formed by joining lower and upper frames 2 and 36, is mounted inside the portable object and control stem 4 is inserted into control device 1 from outside the portable object, control stem 4 slightly lifts position indexing plate 58 against the elastic force of displacement limiting spring 88. If control stem 4 continues to be pushed forwards, there comes a moment when position indexing plate 58 drops into groove 56 under the effect of gravity. Control stem 4 and position indexing plate 58 are then coupled in translation.

Figure 10:
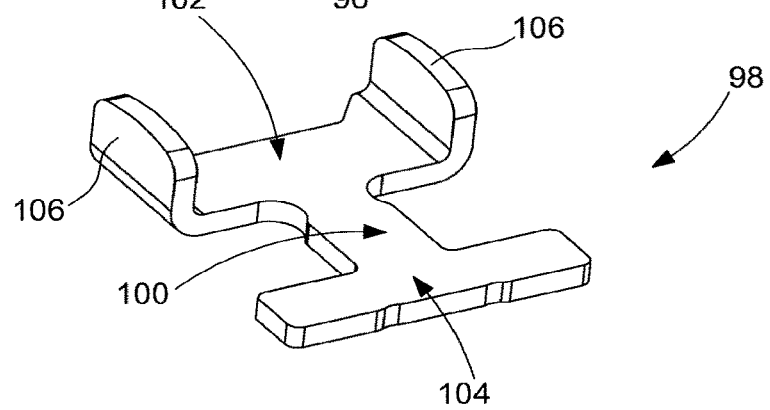
FIG. 10 is a perspective view of the disassembling plate.

A disassembly plate 98 is provided to allow disassembly of control stem 4 (see FIG. 10). This disassembly plate 98 is generally H-shaped and includes a straight segment 100 which extends parallel to longitudinal axis of symmetry X-X of control stem 4 and to which a first and a second crosspiece 102 and 104 are attached. The first crosspiece 102 is also provided at its two free ends with two lugs 106 folded up substantially at right angles. Disassembly plate 98 is received inside a housing 108 provided in lower frame 2 and located underneath control stem 4. This housing 108 communicates with the outside of control device 1 via a hole 110 which opens into a lower face 112 of control device 1 (see FIG. 11). By inserting a pointed tool into hole 110, a thrust force can be exerted on disassembly plate 98 which, via its two lugs 106, in turn pushes position indexing plate 58 against the elastic force of displacement limiting spring 88. Position indexing plate 58 then leaves groove 56 provided in control stem 4 and exerting a slight backward traction on control stem 4 is sufficient to remove the latter from control device 1.

Figure 12A:
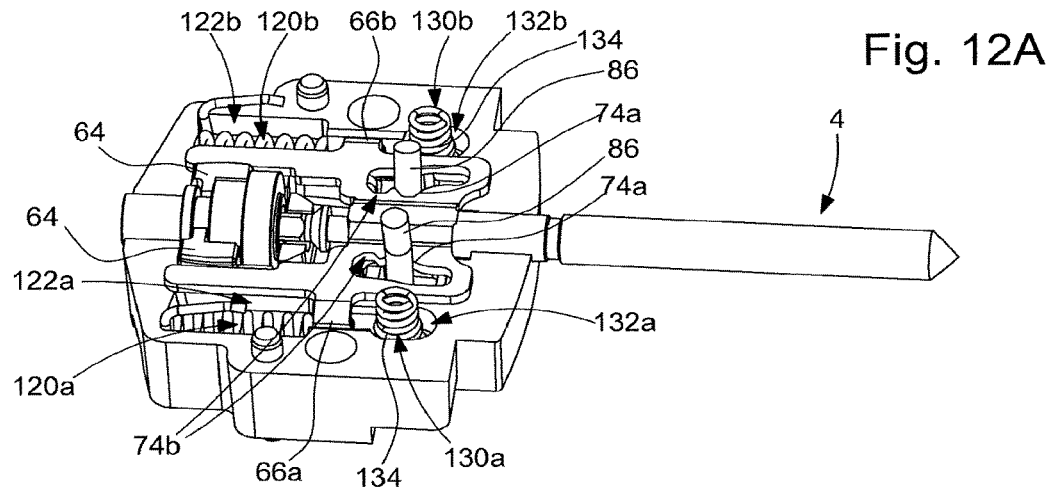
FIG. 12A is a perspective view showing the control stem cooperating with the position indexing plate and the positioning spring, the control stem being in stable position T1.
Figure 12B:
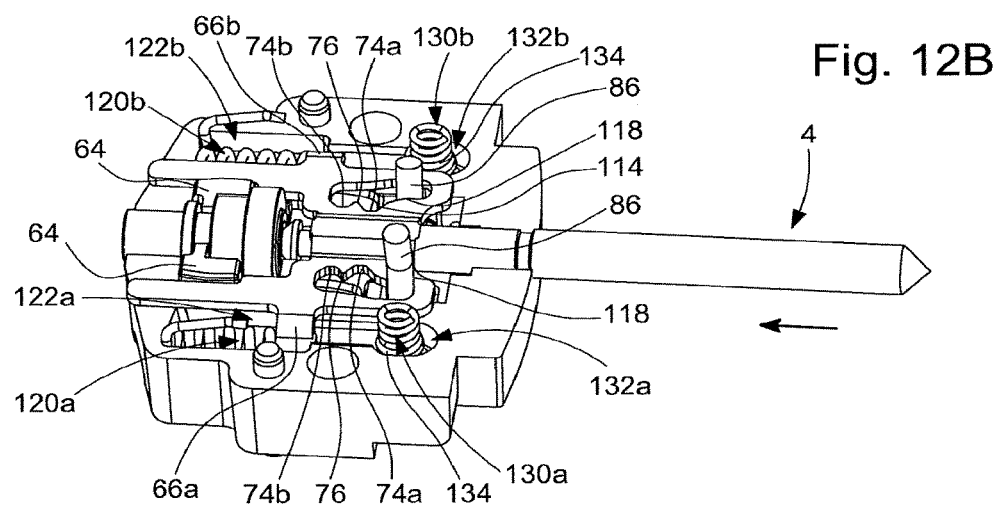
FIG. 12B is a similar view to that of FIG. 12A, with the control stem in an unstable pushed-in position T0.

From its stable rest position T1, control stem 4 can be pushed forwards into an unstable position T0 or pulled out into a stable position T2. These three positions T0, T1 and T2 of control stem 4 are indexed by cooperation between position indexing plate 58 and positioning spring 80. More precisely (see FIG. 12A), the stable rest position T1 corresponds to the position in which ends 78 of arbors 86 of positioning spring 80 project into first recesses 74a of the two apertures 70 provided in guide arms 62 of position indexing plate 58. From this stable rest position T1, control stem 4 can be pushed forwards into an unstable position T0 (see FIG. 12B). During this displacement, ends 78 of arbors 86 of positioning spring 80 leave first recesses 74a and follow a first ramp profile 114 which gradually moves away from longitudinal axis of symmetry X-X of control stem 4 along a first steep slope α (see FIG. 7B). To force ends 78 of arbors 86 of positioning spring 80 to leave first recesses 74a and to engage on first ramp profile 114 by moving away from each other, the user must therefore overcome a significant resistance force.

When they reach a transition point 116, ends 78 of arbors 86 engage on a second ramp profile 118 which extends first ramp profile 114 with a second slope β lower than first slope α of first ramp profile 114. At the instant that ends 78 of arbors 86 of positioning spring 80 cross transition point 116 and engage on second ramp profile 118, the force required from the user to continue moving control stem 4 drops sharply and the user feels a click indicating the transition of control stem 4 between position T1 and position T0. As they follow second ramp profile 118, arbors 86 of positioning spring 80 continue to move slightly away from their rest position and tend to try to move towards each other again under the effect of their elastic return force opposing the thrust force exerted by the user on control stem 4. As soon as the user releases pressure on control stem 4, arbors 86 of positioning spring 80 will spontaneously return down first ramp profile 114 and their ends 78 will again lodge inside first recesses 74a of the two apertures 70 provided in guide arms 62 of position indexing plate 58. Control stem 4 is thus automatically returned from its unstable position T0 to its first stable position T1.

First and second contact springs 120a and 120b are arranged compressed inside a first and a second cavity 122a and 122b provided in lower frame 2. These first and second contact springs 120a and 120b could be helical contact springs, strip-springs or other springs. The two cavities 122a, 122b preferably, but not necessarily, extend horizontally. Because the two contact springs 120a, 120b are installed in the compressed state, their positioning precision is dependent on the manufacturing tolerance of lower frame 2. The manufacturing precision of lower frame 2 is higher than the manufacturing precision of these first and second contact springs 120a, 120b. Consequently, the precision with which position T0 of control stem 4 is detected is high.

Figure 13:
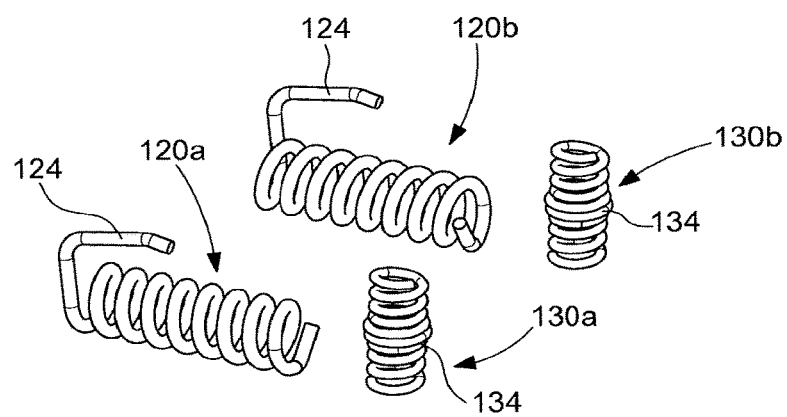
FIG. 13 is a perspective view of the first and second contact springs.
Figure 15:
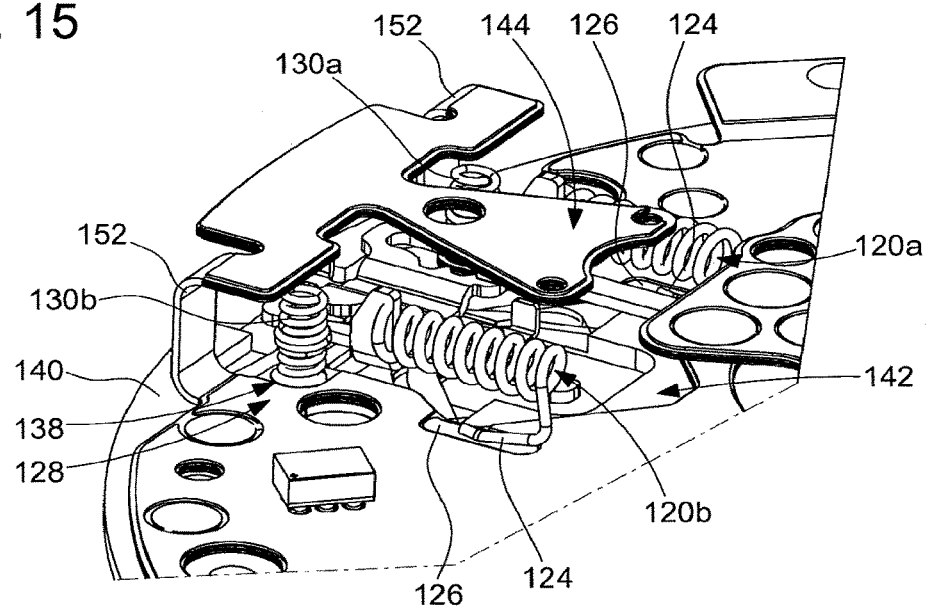
FIG. 15 is a partial, perspective view of the flexible printed circuit sheet on which are arranged the contact pads of first and second contact springs.

As visible in FIGS. 13 and 15, one of the ends of first and second contact springs 120a, 120b is bent to form two contact lugs 124 which will move into abutment on two corresponding first contact pads 126 provided at the surface of a flexible printed circuit sheet 128. The moment that ends 78 of arbors 86 of positioning spring 80 engage on second ramp profile 118 of the two apertures 70 provided in position indexing plate 58 coincides with the moment that fingers 66a, 66b of position indexing plate 58 come into contact with first and second contact springs 120a, 120b. Since this position indexing plate 58 is electrically conductive, when fingers 66a, 66b come into contact with first and second contact springs 120a, 120b, the electric current passes through position indexing plate 58 and closure of the electrical contact between first and second contact springs 120a, 120b is detected.

First and second contact springs 120a, 120b are of the same length. However, preferably, first cavity 122a will be, for example, longer than second cavity 122b, in particular to take account of tolerance problems (the difference in length between the two cavities 122a, 122b is several tenths of a millimetre). Thus, when control stem 4 is pushed forwards into position T0, finger 66a of position indexing plate 58, which is lined up with first contact spring 120a housed inside the first, longest cavity 122a, will come into contact with and start to compress first contact spring 120a. Control stem 4 will continue to move forward and second finger 66b of position indexing plate 58 will come into contact with second contact spring 120b housed inside the second, shortest cavity 122b. At that moment, position indexing plate 58 will be in contact with first and second contact springs 120a, 120b and the electric current will flow through position indexing plate 58, which allows the closure of the electrical contact between the first two contact springs 120a, 120b to be detected. It is noted that fingers 66a, 66b of position indexing plate 58 move into abutment contact with first and second contact springs 120a, 120b. There is thus no friction or wear when control stem 4 is pushed forwards into position T0 and closes the circuit between first and second contact springs 120a, 120b. It is also noted that, the difference in length of first and second cavities 122a and 122b ensures that closure of the electrical contact and entry of the corresponding command into the portable object equipped with control device 1 occur only after a click is felt.

When the two fingers 66a, 66b of position indexing plate 58 are in contact with first and second contact springs 120a, 120b, first contact spring 120a housed inside first, longest cavity 122a is in a compressed state. Consequently, when the user releases pressure on control stem 4, this first contact spring 120a relaxes and forces control stem 4 to return from its unstable pushed-in position T0 to its first stable position T1. The first and second contact springs 120a, 120b thus act simultaneously as electrical contact parts and elastic return means for control stem 4 in its first stable position T1.

Figure 12C:
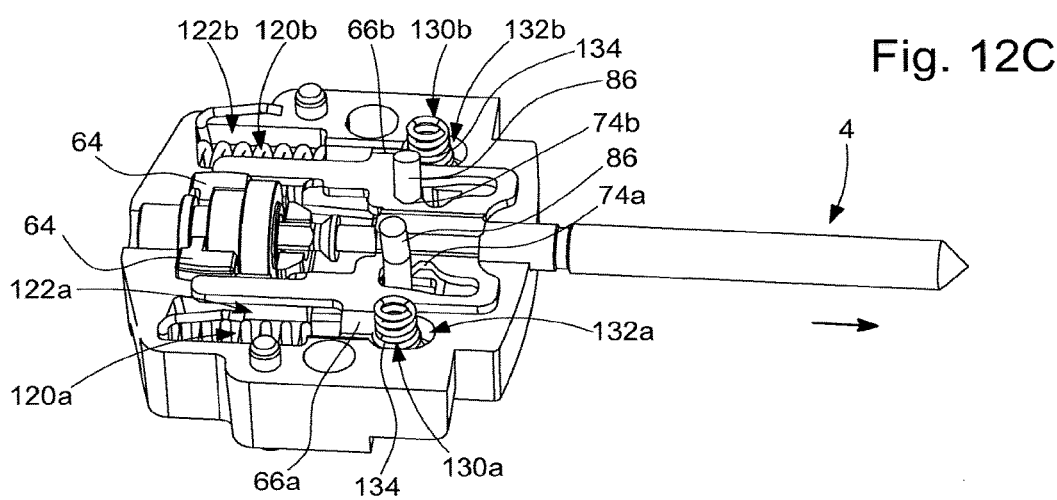
FIG. 12C is a similar view to that of FIG. 12A, with the control stem in stable pulled-out position T2.

From first stable position T1, it is possible to pull control stem 4 backwards into a second stable position T2 (see FIG. 12C). During this movement, ends 78 of arbors 86 of positioning spring 80 will elastically deform to pass from first recesses 74a to second recesses 74b, crossing peaks 76 of the two apertures 70 provided in guide arms 62 of position indexing plate 58. When control stem 4 reaches its second stable position T2, the two fingers 66a, 66b of position indexing plate 58 move into abutment against third and fourth contact springs 130a 130b (see FIG. 13), which are housed inside third and fourth cavities 132a, 132b provided in lower frame 2. These third and fourth contact springs 130a, 130b could be helical contact springs, strip-springs or other springs. Third and fourth cavities 132a, 132b preferably extend vertically for reasons of space in control device 1. Since position indexing plate 58 is electrically conductive, when fingers 66a, 66b come into contact with third and fourth contact springs 130a, 130b, the electric current flows through position indexing plate 58 and closure of electrical contact T2 between these contact springs 130a, 130b is detected.

It will be noted that, in the case of stable position T2, fingers 66a, 66b of position indexing plate 58 also come into abutment contact with third and fourth contact springs 130a, 130b, thereby avoiding any risk of wear from friction. Further, third and fourth contact springs 130a, 130b are capable of bending when fingers 66a, 66b of position indexing plate 58 collide therewith, and therefore of absorbing any lack of precision in the positioning of position indexing plate 58.

Figure 14A:
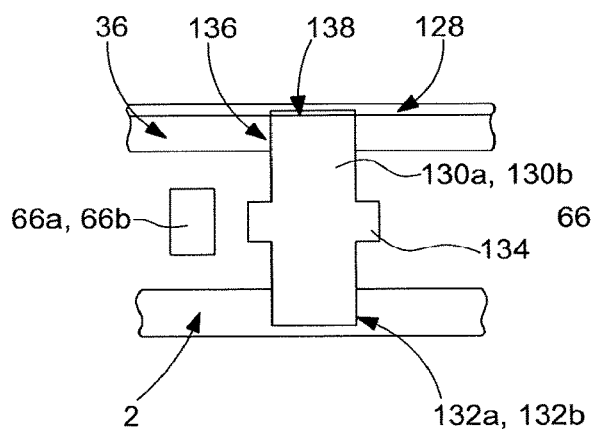
FIGS. 14A and 14B are schematic views that illustrate the cooperation between the fingers of the control stem position indexing plate and third and fourth contact springs.
Figure 14B:
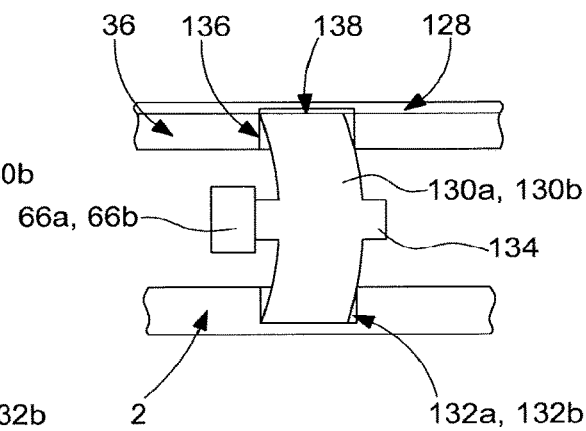

Preferably, but not necessarily, third and fourth contact springs 130a, 130b are arranged to work in flexion (see FIGS. 14A and 14B). Indeed, with contact springs 130a, 130b whose diameter is constant, fingers 66a, 66b of position indexing plate 58 come into contact with contact springs 130a, 130b over a large surface close to their points of attachment in lower frame 2 and upper frame 36. The proximity of the contact surface to the attachment points of contact springs 130a, 130b induces shearing stresses in contact springs 130a, 130b which may lead to premature wear and breakage of the latter. To overcome this problem, contact springs 130a, 130b have, preferably substantially at mid-height, an increase in diameter 134 which comes into contact with fingers 66a, 66b of position indexing plate 58 when control stem 4 is pulled into its stable position T2. At their upper end, third and fourth contact springs 130a, 130b are guided in two holes 136 provided in upper frame 36 and come into contact with second contact pads 138 provided at the surface of flexible printed circuit sheet 128. It is clear that, when control stem 4 is pulled backwards into its stable position T2, fingers 66a, 66b of positioning indexing plate 58 come into contact on a reduced surface with third and fourth contact springs 130a and 130b at their largest diameter 134, which allows contact springs 130a, 130b to bend between their two points of attachment in lower frame 2 and upper frame 36.

Figure 16:
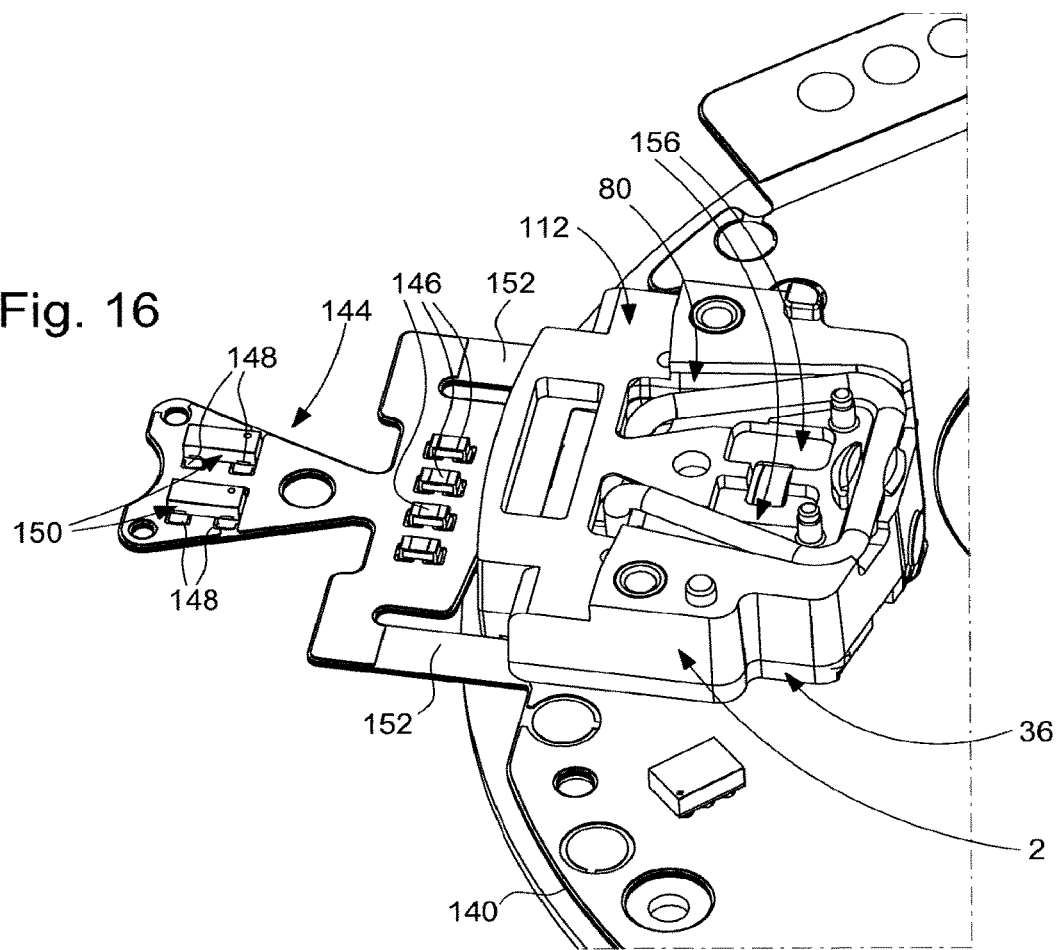
FIG. 16 is a perspective view of the free portion of the flexible printed circuit sheet on which are fixed the inductive sensors.

In FIG. 15, lower and upper frames 2 and 36 have been deliberately omitted to facilitate understanding of the drawing. As represented in FIG. 15, flexible printed circuit sheet 128 is fixed on a plate 140 located on the dial side of the portable object. It includes, in particular, a cutout 142 adapted in shape and size to receive upper frame 36. One portion 144 of flexible printed circuit sheet 128 remains free (see FIG. 16). This free portion 144 of flexible printed circuit sheet 128 carries a plurality of electronic components 146, in addition to third contact pads 148, on which are fixed at least one and, in the example represented, two inductive sensors 150. Fixing inductive sensors 150 to third contact pads 148 allows these inductive sensors 150 to be connected, via flexible printed circuit sheet 128, to a power source and to a microprocessor (not represented) housed inside the portable object. The power source will supply inductive sensors 150 with the energy required to operate, and the microprocessor will receive and process the signals supplied by inductive sensors 150.

The free portion 144 of flexible printed circuit sheet 128 is connected to the rest of flexible printed circuit sheet 128 by two strips 152, which allow free portion 144 to be folded around the assembly of upper frame 36 and lower frame 2, and then folded down against lower face 112 of lower frame 2, so that inductive sensors 150 penetrate two housings 156 provided in lower face 112 of lower frame 2. Thus positioned inside their housings 156, inductive sensors 150 are precisely located under magnetized ring 18, which ensures reliable detection of the direction of rotation of control stem 4.

Figure 17A:
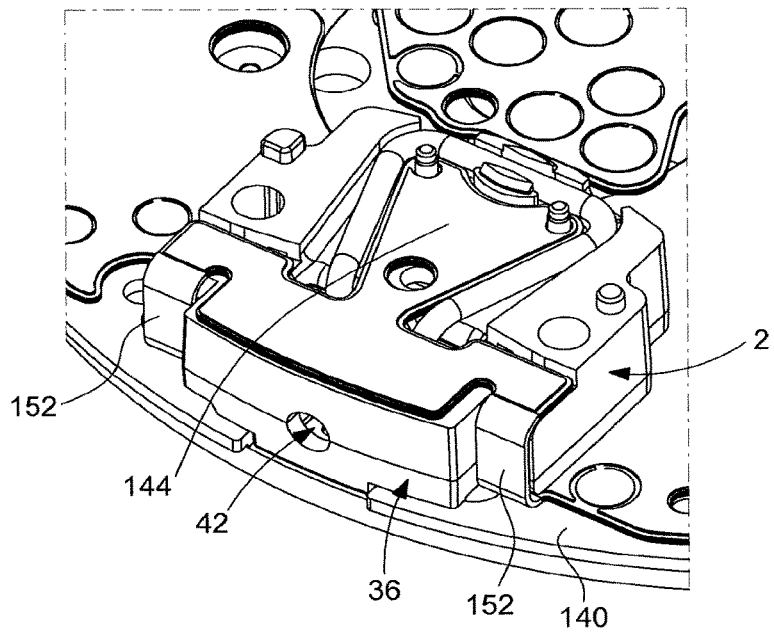
FIG. 17A is a perspective view of the control device, onto a rear face of which is folded the free portion of the flexible printed sheet.
Figure 17B:
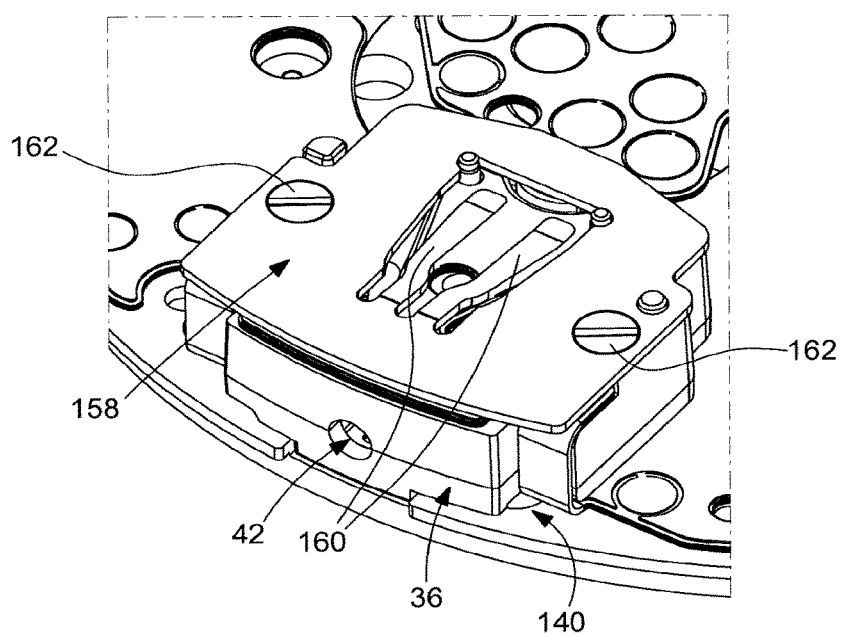
FIG. 17B is a perspective view of the control device, onto a rear face of which the free portion of the flexible printed circuit sheet is folded and held by means of a holding plate fixed by screws to the control device.

Once free portion 144 of flexible printed circuit sheet 128 has been folded down against lower frame 2 (see FIG. 17A), the assembly is covered by a holding plate 158, provided with at least one elastic finger 160 (two in the example represented), which exerts on inductive sensors 150 an elastic pressure force directed vertically upwards so as to press these inductive sensors 150 against the bottom of their housings 156 (see FIG. 17B). Elastic fingers 160 press on flexible printed circuit 128 preferably at the place where inductive sensors 150 are fixed. Holding plate 158 is fixed to lower frame 2, for example by means of two screws 162.

Figure 22:
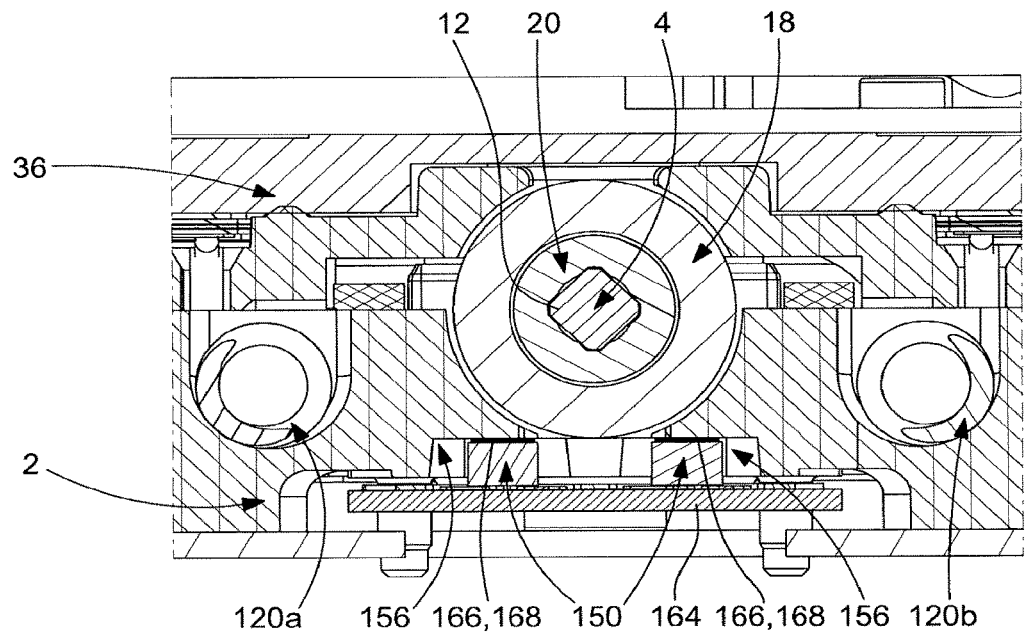
FIG. 22 is a schematic representation of a simplified mode of fixing the inductive sensors to the bottom of their housings inside the frame.
Figure 23:
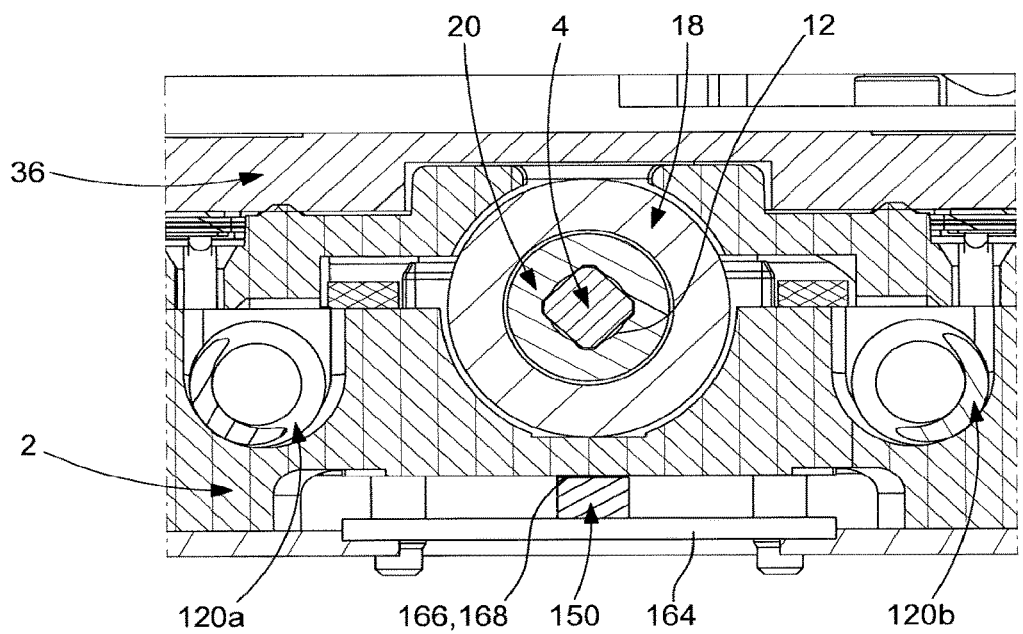
FIG. 23 illustrates the case where the inductive sensors are simply held in abutment against a support surface of the frame.

For the sake of simplification, it is possible (see FIG. 22) to dispense with holding plate 158 and its elastic fingers 160 by fixing inductive sensor or sensors 150 to a stiff printed circuit board 164 connected to flexible printed circuit sheet 128 by a conductive element, for example of the type with two strips 152. A thin adhesive film 166 is deposited in the bottom of housings 156, then stiff printed circuit board 164 is pressed against lower frame 2, so that inductive sensors 150 are adhesive bonded to the bottom of housings 156. It is even possible (see FIG. 23) to dispense with housings 156 and simply bond inductive sensors 150 by means of a thin adhesive film 166 or to elastically hold inductive sensors 150 by means of elastic fingers 160 against a support surface 168 of lower frame 2.

Figure 18:
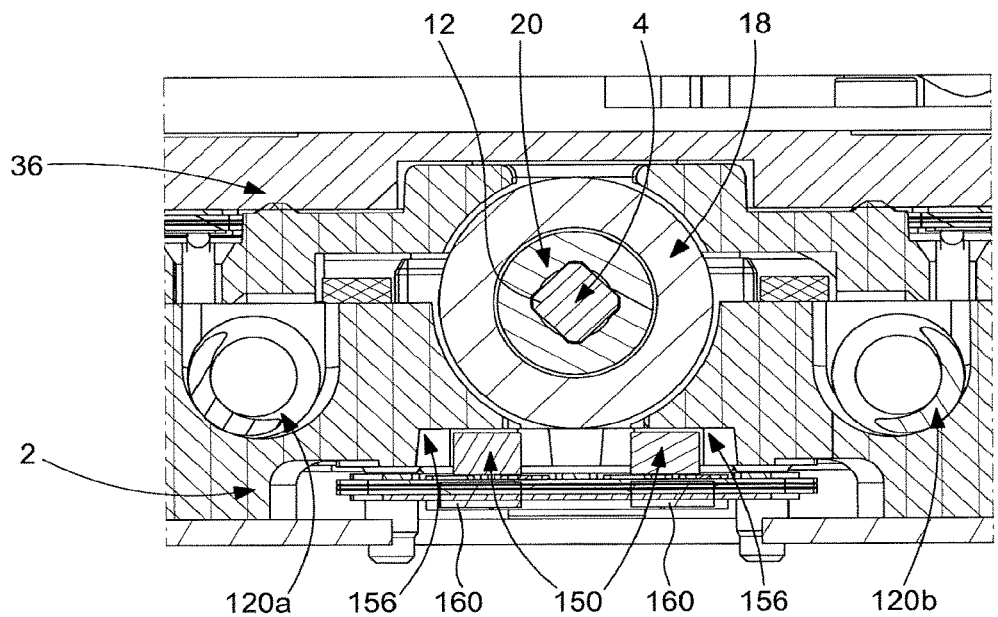
FIG. 18 is an elevation view of the system for detecting the position of the magnetized ring by means of two inductive sensors.

Control stem 4 is carried by lower frame 2 which acts as a cradle. Likewise, the two inductive sensors 150 are disposed inside two housings 156 provided in said lower frame 2, and are pressed against the bottom of these housings 156 by one or two elastic fingers 160 (see FIG. 18). Consequently, the relative positioning precision of inductive sensors 150 and magnetized ring 18, which is fixedly mounted relative to control stem 4, is determined only by the precision with which lower frame 2 is made. The manufacturing precision of lower frame 2, which is for example made of injected plastic or of a non-magnetic metallic material such as brass, is sufficient to guarantee the proper positioning of inductive sensors 150 and of magnetized ring 18 even in the case of large scale production. Further, since inductive sensors 150 are elastically forced against the bottom of housings 156 by elastic finger(s) 160, this makes it possible to compensate for any play resulting from manufacturing tolerances. These manufacturing tolerances may, in particular, result from the step of soldering inductive sensors 150 on flexible printed circuit sheet 128. This soldering operation is performed, for example, in a furnace using a soldering paste deposited on contact pads 148 of flexible printed circuit sheet 128.

The inductive sensor or sensors 150 are preferably oriented such that their sensing element detects a fluctuation in magnetic induction only along vertical direction z. In other words, the inductive sensors are completely insensitive to horizontal components along the orthogonal x and y axes of magnetic induction.

Figure 19:
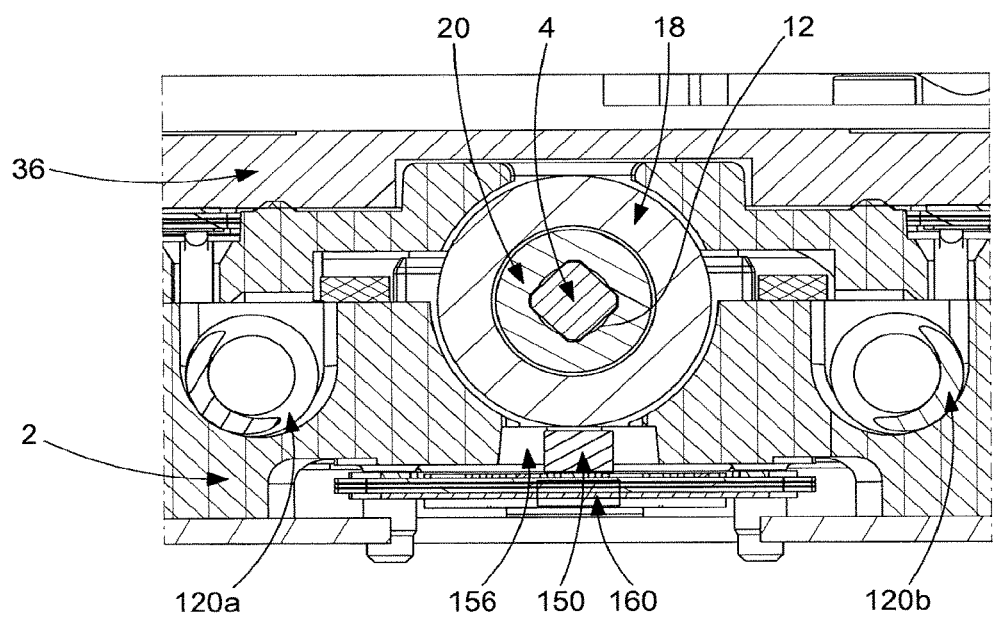
FIG. 19 is an elevation view of the system for detecting rotation of the magnetized ring by means of a single inductive sensor.

In the case where a single inductive sensor 150 is provided (see FIG. 19), the amplitude of rotation and the position of control stem 4 may be determined with only average precision. Indeed, when magnetized ring 18 rotates as a result of actuation of control stem 4, inductive sensor 150 produces a sinusoidal signal whose amplitude of variation fluctuates according to the value of the angle concerned. For example, within an area close to the value $\pi/2$, the sinusoidal signal varies only slightly, such that the amount of movement and the position of control stem 4 can only be determined with average precision. However, within an area close to value u, the sinusoidal signal fluctuates sharply, such that the amount of rotation and the position of control stem 4 can be determined with high precision.

In the case where one can be satisfied with average precision in the detection of the position and amount of rotation of control stem 4, the system described above is entirely suitable. However, in the case where very high measurement precision is required, it is preferable to equip the portable object according to the invention with two inductive sensors 150. Indeed, by providing for the use of two inductive sensors 150, it is possible to determine both the amplitude and the direction of rotation of control stem 4 with increased precision. To achieve this, the two inductive sensors 150 are arranged at equal distances on either side of a vertical plane P of longitudinal symmetry of control stem 4. Preferably, the two inductive sensors 150 are arranged with respect to control stem 4 such that, when magnetized ring 18 rotates as a result of the actuation of control stem 4, the two inductive sensors 150 produce sinusoidal signals $\sin(x)$ and $\sin(x+\delta)$ that are out of phase relative to each other by an angle $\delta$ comprised between 60° and 120°, and preferably equal to 90°. To calculate the relative arrangement of the two inductive sensors and magnetized ring 18, it is possible, for example, to perform successive iterations by means of finite element calculation software.

Owing to the phase shift δ between the sinusoidal measurement signals sin(x) and sin(x+δ) produced by the two inductive sensors 150, when the arctangent function of the ratio between these two measurement signals is calculated, a straight line is obtained. Consequently, it is possible, from a rotary motion of control stem 4, to obtain a linear response from the system formed by control stem 4, magnetized ring 18 and the two inductive sensors 150. This linearization of the rotation of control stem 4 advantageously permits absolute detection of the position of control stem 4. In other words, it is possible at any time to know the direction of rotation and the position of control stem 4. Further, owing to phase shift δ, there is constantly a situation where, when one of the sinusoidal measurement signals sin(x) produced by the two inductive sensors 150 varies slightly, the other sinusoidal signal sin(x+δ) varies more sharply and vice versa, such that the ratio between these two signals always gives precise information about the rotation of control stem 4.

It was mentioned above that inductive sensors 150 were preferably oriented such that their sensing element only detects fluctuations in magnetic induction along the vertical axis z. This component of magnetic induction is the sum of inductions along axis z generated by magnetized ring 18 and by the magnetic field outside the portable object. However, given that inductive sensors 150 are very close to each other, the influence exerted thereon by the external magnetic field is substantially the same for both inductive sensors 150. Consequently, calculating the ratio between the two sinusoidal signals sin(x) and sin(x+δ) eliminates the component of magnetic induction due to the magnetic field outside the portable object. The response of the system formed by control stem 4, magnetized ring 18 and inductive sensors 150 is thus totally independent of the external magnetic field, and it is not necessary to take steps to magnetically shield the portable object. Likewise, the response of the system is independent of temperature insofar as the temperature has the same effect on both inductive sensors.

It goes without saying that this invention is not limited to the embodiment that has just been described and that various simple modifications and variants can be envisaged by those skilled in the art without departing from the scope of the invention as defined by the annexed claims. In particular, the dimensions of the magnetized ring may be extended so that it corresponds to a hollow cylinder.

NOMENCLATURE

1. Control device
2. Lower frame
4. Control stem
X-X Longitudinal axis of symmetry
6. Rear end
8. Actuation crown
10. Front end
12. Square section
14. Magnetic assembly
16. Smooth bearing
18. Magnetized ring
20. Support ring
22a First section
D1. First external diameter
22b. Second section
D2. Second external diameter
24. Shoulder
26. Square hole
28. Cylindrical housing
D3. First internal diameter
30. Annular hole
D4. Second internal diameter
D5. Third external diameter
32. Circular collar
34a First groove
34b. Second groove
36. Upper frame
38. First receiving surface
40. Second receiving surface
42. Hole
44a, 46a Third and fourth undercut surfaces
44b, 46b Complementary undercut surfaces
48. Case middle
49. Bottom
50. Annular collar
52. Cylindrical section
54. Back section
56. Groove
58. Position indexing plate
60. Curved portion
62. Guide arm
64. Studs
66a, 66b Fingers
68. Rim
70. Apertures
72. Profile
74a. First recess
74b. Second recess
76. Peak
78. Ends
80. Positioning spring
82. Arms
84. Base
86. Arbors
88. Displacement limiting spring
90. Central portion
92. Pair of elastic arms
94. Pair of elastic arms
96. Stiff lugs
98. Disassembly plate
100. Straight segment
102. First crosspiece
104. Second crosspiece
106. Lugs
108. Housing
110. Hole
112. Lower face
114. First ramp profile
α First slope
116. Transition point
118. Second ramp profile
β Second slope
120a, 120b. First and second contact spring
122a, 122b. First and second cavity
124. Contact lugs
126. First contact pads
128. Flexible printed circuit sheet
130a, 130b. Third and fourth contact springs
132a, 132b. Third and fourth cavities
134. Increase in diameter
136. Holes
138. Second contact pads
140. Plate 142. Cutout
144. Free portion
146. Electronic components
148. Third contact pads
150. Inductive sensors
152. Strips
156. Housings
158. Holding plate
160. Elastic fingers
162. Screw
164. Stiff printed circuit board
166. Adhesive layer
168. Support surface

What is claimed is:

1. A portable object comprising:
a frame arranged to serve as a cradle for a control stem, wherein the actuation in rotation of the control stem makes it possible to control at least one electronic or mechanical function of the portable object, and
a magnetized ring being driven in rotation by the control stem, the rotation of the magnetized ring being detected by at least one inductive sensor held in abutment against a surface of the frame,
wherein the inductive sensor is disposed inside a housing of the frame inside which the inductive sensor is held, and
wherein the portable object includes a holding plate provided with at least one elastic finger which, by pressure on the inductive sensor, holds said inductive sensor inside the housing in which said sensor is disposed.

2. The portable object according to claim 1, wherein the inductive sensor is fixed to a printed circuit sheet and the elastic finger presses on the printed circuit sheet at the place where the inductive sensor is fixed.

3. The portable object according to claim 2, wherein the printed circuit sheet is flexible and wherein the flexible printed circuit sheet is folded down onto the frame such that the inductive sensor is disposed inside the housing.

4. The portable object according to claim 3, wherein the elastic finger ensures the immobilization of the inductive sensor in a vertical direction.

5. The portable object according to claim 4, wherein the elastic finger is arranged to force the inductive sensor against a bottom of the housing inside which said sensor is disposed.

6. The portable object according to claim 5, wherein the inductive sensor includes an element sensitive to fluctuations in magnetic induction which is oriented such that the sensing element detects a fluctuation in magnetic induction only along the vertical direction.

7. The portable object according to claim 4, wherein the inductive sensor includes an element sensitive to fluctuations in magnetic induction which is oriented such that the sensing element detects a fluctuation in magnetic induction only along the vertical direction.

8. The portable object according to claim 2, wherein the elastic finger ensures the immobilization of the inductive sensor in a vertical direction.

9. The portable object according to claim 8, wherein the elastic finger is arranged to force the inductive sensor against a bottom of the housing inside which said sensor is disposed.

10. The portable object according to claim 9, wherein the inductive sensor includes an element sensitive to fluctuations in magnetic induction which is oriented such that the sensing element detects a fluctuation in magnetic induction only along the vertical direction.

11. The portable object according to claim 8, wherein the inductive sensor includes an element sensitive to fluctuations in magnetic induction which is oriented such that the sensing element detects a fluctuation in magnetic induction only along the vertical direction.

12. The portable object according to claim 1, wherein the elastic finger ensures the immobilization of the inductive sensor in a vertical direction.

13. The portable object according to claim 12, wherein the elastic finger is arranged to force the inductive sensor against a bottom of the housing inside which said sensor is disposed.

14. The portable object according to claim 13, wherein the inductive sensor includes an element sensitive to fluctuations in magnetic induction which is oriented such that the sensing element detects a fluctuation in magnetic induction only along the vertical direction.

15. The portable object according to claim 12, wherein the inductive sensor includes an element sensitive to fluctuations in magnetic induction which is oriented such that the sensing element detects a fluctuation in magnetic induction only along the vertical direction.

16. The portable object according to claim 1, wherein the portable object includes two inductive sensors which are housed inside two housings of the frame and which are disposed at equal distances on either side of a vertical plane of longitudinal symmetry of the control stem.

17. The portable object according to claim 16, wherein the two inductive sensors are arranged with respect to the control stem such that, when the magnetized ring rotates as a result of actuation of the control stem, the two inductive sensors produce signals that are out of phase relative to each other by an angle comprised between 60° and 120°.

18. The portable object according to claim 1, wherein the holding plate is fixed to the frame.

19. The portable object according to claim 1, wherein the holding plate includes two of the elastic finger.

* * * * *